D. D. Parmelee.
Artificial Leg.
No. 1,907. Reissued Mar. 21. 1865.
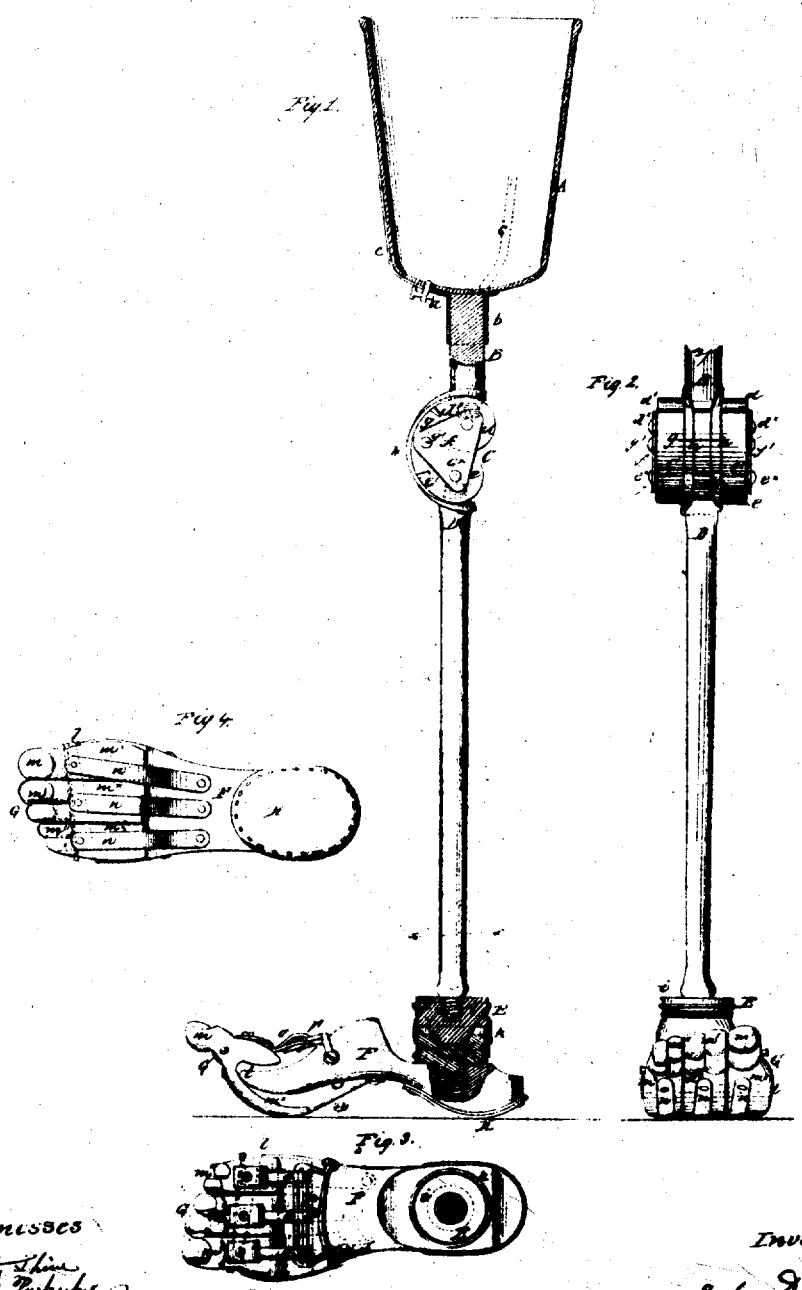
Witnesses
Inventor.

UNITED STATES PATENT OFFICE.

UBOIS D. PARMELEE, OF NEW YORK, N. Y.

IMPROVEMENT IN ARTIFICIAL LEGS.

Specification forming part of Letters Patent No. 37,637, dated February 10, 1863; Reissue No. 1,907, dated March 21, 1865.

*To all whom it may concern:*

Be it known that I, DUBOIS D. PARMELEE, of the city, county, and State of New York, have invented certain new and useful Improvements in Artificial Limbs; and I do hereby declare that the following is a full, clear, and exact description of the same, reference being had to the accompanying drawings, forming a part of this specification, in which—

Figure 1 represents a sectional side elevation of a leg constructed according to my invention. Fig. 2 is a front view of the same. Fig. 3 is a horizontal section taken in the plane indicated by the line *x x*, Fig. 1. Fig. 4 is an inverted plan of the same.

Similar letters of reference in the three views indicate corresponding parts.

The first part of this invention relates to the bucket or socket of artificial legs or arms intended to receive the stump; and it consists in the method of fastening such bucket to the stump by means of atmospheric pressure in such a manner that the straps usually employed for this purpose can be dispensed with and at the same time a perfect fit of the bucket is attained.

The invention consists, further, in the peculiar construction of the joints or articulations, which are formed by terminating the portions of the limbs at the point of their movable connections in transversely-cylindrical surfaces, each being provided with a projecting lip or stop, and combined with a double-concave sector fitting the cylindrical surfaces between the stops by means of metallic clasps in such a manner that on bending the limb the cylinders may roll rather than slide over each other, and consequently diminish the friction usually attending the operation of artificial limbs. In the application of this device to knee-joints a cylindrical surface is formed on the upper end of the large bone of the leg, (tibia,) and another on the lower end of the thigh-bone,(femur.) The metallic clasp which unites these two main parts of the leg with the double-concave sector is secured by means of pins traversing the cylinders at their axes and the sector at a point equidistant from the said axes. With this is combined a spring or elastic band, whereby the forward movement of the foot while walking is facilitated and uniform elastic pressure on the knee-pan is effected; and my invention further consists in dividing the toe piece of the foot in two or more distinct parts, each being provided with a separate joint and adjustable spring in such a manner that the toes can adapt themselves to the inequalities of the ground; and it finally consists in the arrangement of curved tails or shanks projecting from the toes on the under side or sole of the foot, in combination with suitable leather straps and springs and adjusting-clasp, in such a manner that the rigidity in the play of the toes can be regulated at pleasure and that the toes are kept in the proper position to prevent interference when the foot is brought forward, while when brought down on the ground the foot shall present a comparatively large and a yielding base, enabling the person wearing the leg to maintain his or her balance with little difficulty.

To enable those skilled in the art to make and use my invention, I will proceed to describe the construction and operation of a leg to which my improvements are applied.

Referring to the drawings, A represents the bucket or socket or receptacle of the stump of the amputated limb. It may be made of any suitable non-porous material, or of a material rendered non-porous by the employment of varnishes or otherwise. I prefer to make them of vulcanite or hard rubber, being light, easily worked, and impervious to air. The bucket should be made so as to perfectly fit the stump, and provided at a convenient part thereof with an air-valve, *a*, so that on placing the stump into the bucket with the air-valve open the air shall be expelled from the bucket. If after setting the stump the valve be closed, the pressure of the atmosphere will hold the bucket in its place till air is readmitted. To obviate inconvenience from insensible perspiration, a dry sponge, cotton, wool, or a small bag of fused chloride of calcium may be placed at the bottom of the bucket. This bucket is fastened to that part representing the thigh-bone or femur B, when used for a leg amputated above the knee, by a metal ferrule, *b*. From this ferrule project three or more metal bands, *c*, which are riveted to the bucket. By this arrangement it is perfectly easy to adjust the length of the limb with utmost accuracy simply by shifting the ferrule *b* up or down on the artificial thigh-bone B until the bucket has attained the required position.

C is the knee-joint, which is formed of two cylinders, *d* and *e*, one being fastened to the lower end of the artificial thigh-bone B and the other to the upper end of the artificial large bone of the leg or tibia D. Each of these cylinders is provided with a lip or offset, *d′ e′*, and they rotate, respectively, on axles *d** and *e**, which have their bearings in side clasps, *f*. A double-concave sector, *g*, is located between the cylinders *d e*, being retained in its place by pivots *g′*, passing through the clasps *f*. The concave sides of this sector, which fit the surfaces of the cylinders *d e*, form the artificial knee-pan, and its edges, by coming in contact with the lips or offsets *d′ e′*, confine the motion of the joint within the desired limits. An india-rubber band, *h*, which is stretched over the convex surface of the knee-pan and around the supports B D, has a tendency to straighten the leg and unbend the knee, thereby assisting in the movement of the foot forward while walking, giving at the same time uniform elasticity to the artificial knee-pan. By the movement of the joint the cylinder *d* rolls over the surface of the lower one, *e*, and the friction thus created is greatly reduced.

The heel or ankle joint E is here shown as formed of two pieces, *i j*, one of which is provided with a semispherical socket and the other with a corresponding projection or ball. This ball should accurately fit the socket, and each of the two pieces *i j* is provided with flanges, whereby the movement or play of said parts in either direction is confined between limits such as may be desired. The upper part, *i*, of the heel-joint is fastened to the lower end of the artificial tibia, and the lower part, *j*, of said joint is screwed or otherwise firmly secured to the foot-piece F, and the two parts *i j* are fastened together by an india-rubber tube, *k*, of proper thickness and strength, which is stretched over both and secured to each by a cord or in any other suitable manner.

The foot-piece F corresponds in form to the bones of the instep and the heel-bone of the natural foot. Its front end, *l*, is rounded off and forms the fulcrum for the toe-piece G. The latter is divided into three (more or less) distinct parts, *m m′ m″*, one of which corresponds to the large toe and each of the others to two of the other toes. These toe-pieces are held in place by bands *n*, of leather or other inelastic but flexible material, fastened by means of screws or any other desirable means to the under side of both the toe and the foot piece, and by elastic bands *o*, of india-rubber or any other suitable yielding material, fastened in any convenient manner to the upper surface of both the toe-piece and the foot-piece. The inner ends of the elastic bands *o* pass through a metal clasp, *p*, so as to admit tightening or loosening according to the requisite rigidity in the play of the toes. By the action of these elastic bands or springs the points of the toes are thrown up, so as to prevent interference when bringing the foot forward, and their position is regulated by the length of the leather bands *n*, which bear against the stems or the tails *m**, extending from the toe-pieces *m m′ m″* below the point of the foot-piece F, as shown in Fig. 1 of the drawings. If the weight of the body is upon the front of the foot by the action of the tails *m**, the toe-pieces are turned down and a large base is attained, thereby enabling the person wearing the leg to maintain his or her balance with little labor. The toes, by being divided, are capable of adapting themselves to the inequalities of the ground. The heel H is covered with an elastic pad, to prevent jarring in the act of walking.

The case for this leg or arm may be made of cork, papier-maché, or any other suitable material, but I would recommend a leather tube, cut into the shape of the limb, sewed up, and small hoops of steel springs placed and fastened on the interior at about three inches apart, to give form to the case, and at the same time preserve its flexibility. Such a case might be fastened by hooks to the bucket at the top, and when used for a leg be made to connect at the bottom with the boot or shoe inclosing the foot.

Having thus fully described my invention, what I claim as new, and desire to secure by Letters Patent, is—

1. Fastening the bucket of artificial limbs to the stump by means of atmospheric pressure substantially in the manner specified.

2. The adjustability, by the means herein described, or by means substantially the same, of the limb with respect to length, as set forth.

3. Forming the articulation or movable connection between two parts of an artificial limb by means of a clasp linked to or swinging in both, substantially as described.

4. Combining with the two parts of an artificial limb an intermediate stop when the said parts and stop are connected by means of a clasp or the equivalent thereof, linked to and swinging in the three parts, substantially as described.

5. Making the opposite ends of the limb at the movable joint of cylindrical form and holding the same in such relative position as to move upon each other with rolling friction, substantially as set forth.

6. In combination with the last-named device the double-concave sector or artificial knee-pan, together with projections or stops on the cylindrical ends of the limbs, as herein shown and described.

7. The movable joint, constructed and arranged as described, in combination with a spring or elastic band operating in the manner and for the purposes set forth.

8. The combination of the ball and socket with an elastic sleeve, the whole forming a movable joint, substantially as herein set forth.

9. Forming the foot of two parts—to wit, a foot-piece proper and a toe-piece, when the latter is arranged to rock upon the former and the two held by flexible and elastic straps, in the manner and for the purpose set forth.

10. The divided toe-piece, so as to allow of its adapting itself to the inequalities of the ground, substantially as set forth.

11. The arrangement of the stems or tails projecting from the under side of the toe-pieces, in combination with the bands of leather or other suitable material, and with the elastic bands adjustable by a metal clasp or its equivalent, all constructed and operating substantially in the manner and for the purpose described.

In testimony whereof I have signed my name to this specification before two subscribing witnesses.

D. D. PARMELEE.

Witnesses:
T. A. WHITAKERS,
THOS. A. GERE.